May 29, 1956
M. F. KAUTZ
2,748,225
CONTROL DEVICE
Filed March 2, 1953
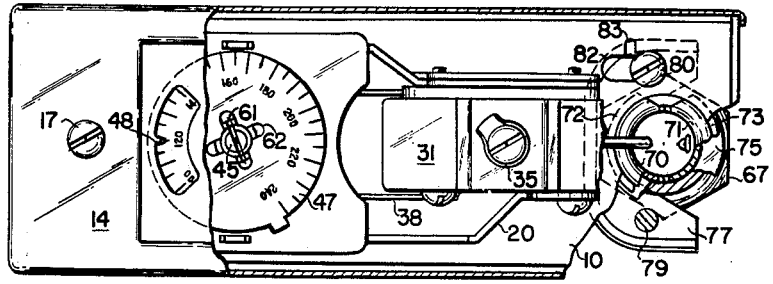
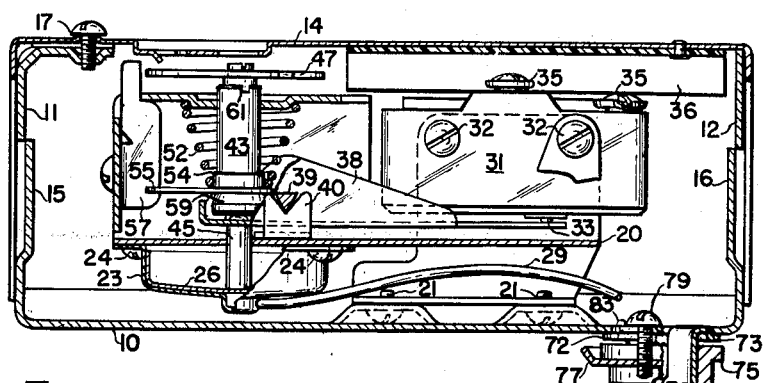
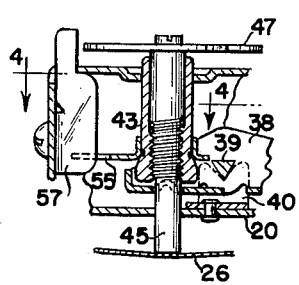
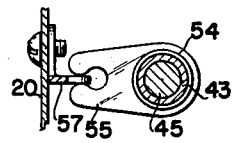
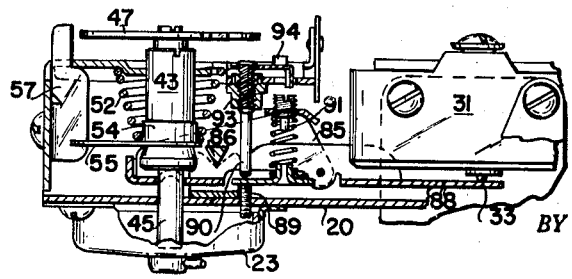
INVENTOR.
MURRELL F. KAUTZ
BY
*George H. Fisher*
ATTORNEY

United States Patent Office 2,748,225
Patented May 29, 1956

2,748,225
CONTROL DEVICE

Murrell F. Kautz, Minneapolis, Minn., assignor to Minneapolis-Honeywell Regulator Company, Minneapolis, Minn., a corporation of Delaware Application March 2, 1953, Serial No. 339,798

11 Claims. (Cl. 200—140)

This invention relates to condition responsive control devices and is particularly directed to a temperature responsive switch.

One object of the invention is to provide a control device in which the control point indicated by suitable indicia can be made to agree with the condition value at which control means, e. g. a switch, is actuated.

Another object of the invention is to provide a novel switch actuating linkage.

A further object of the invention is to provide a condition responsive switch in which the difference in condition value between switch opening and switch closing condition values is adjustable.

Another object is to provide a temperature responsive device of the fluid expansion type wherein the temperature sensing bulb is directly exposed to the medium being sensed and a fluid tight seal is effected at the bulb.

Other objects will be evident from the specification and claims and from the drawing, in which Figure 1 is an elavation, partly in section, of an insertion temperature sensitive switch, Figure 2 is a plan view, partly in section of the device shown in Figure 1, Figure 3 is a fragmentary view corresponding to a part of Figure 1, but sectioned to show the cooperation of certain parts in detail, Figure 4 is a fragmentary section taken on line 4—4 of Figure 3, and Figure 5 is a fragmentary view of a control device similar to that shown in Figure 1 but having a differential adjusting mechanism.

The invention will be described in connection with a thermostat for sensing the temperature of liquids which has a sensing bulb adapted for direct immersion in the liquid.

As seen in Figures 1 and 2, a frame 10 in the form of a shallow channel has upwardly extending end portions 11 and 12 which cooperate with a cover 14 to provide an enclosure for mechanism to be described below. Knockouts 15 and 16 are provided in the frame end portions and either one may be removed to accommodate electrical wiring. A screw 17 secures the cover 14 to the frame 10. A sub-frame 20 is secured to the frame 10 by a pair of screws 21. A cup-shaped chamber 23 is secured to the sub-frame 20 by screws 24 and in conjunction with a cup-shaped diaphragm 26 forms an expansible chamber whose volume may be changed by varying the amount of fluid admitted between the diaphragm and the chamber. The diaphragm 26 is joined to the chamber 23 at its periphery in any suitable manner such as by seam welding. While the diaphragm 26 has been illustrated as of plain cup-shaped configuration, it may be corrugated in a way to increase its flexibility. The chamber 23 is connected to a sensing bulb 28 by a flexible capillary tube 29 and the diaphragm chamber, tube and bulb are filled with a thermostatic liquid. It will be understood that an increase in tempearture at the bulb 28 will force liquid through the tube 29 into the daiphragm chamber to raise the central portion of the diaphragm 26.

A snap switch 31 of the type disclosed in McGall 1,960,020 is secured to the sub-frame 20 by screws 32 and is actuated by the thermostatic element by a mechanism to be described below. The switch 31 has an actuating button 33 which actuates the switch mechanism between two operative positions depending upon the position of the button 33. It will be understood that the force required to depress the button 33 to move the switch mechanism to one of its actuated positions is somewhat greater than the force at the button 33 at which the switch will return to its original operative condition. This is a characteristic of all snap switches of this type. The switch 31 is provided with screw terminals 35. A sheet of insulating material 36 is secured to the inside of the cover 14 and overlies the terminals 35 to prevent the possibility of an electrical connection to the cover.

A lever 38 has a knife edge 39 secured thereto and the knife edge 39 engages a saddle 40 carried by the sub-frame 20 to provide a pivot for the lever 38 in the frame. It will be understood that the saddle 40 provides a pair of spaced pivots, one located on each side of the lever 38 to establish a stable pivotal axis for the lever. The right hand end of the lever 38 extends beneath the switch button 33 and is adapted to actuate the switch. The left hand end of the lever 38 extends beneath a nut 43 which is in screw threaded engagement with a rod 45 whose lower end is guided by an opening in the sub-frame 20. The bottom of the rod 45 is in abutting engagement with the diaphragm 26. The nut 43 has a cylindrical upper portion which is guided in an opening in the upper portion of the sub-frame 20. It will be seen that both the nut 43 and the rod 45 may be both rotated and moved axially in the sub-frame 20. On an increase in temperature the diaphragm 26 will be raised to raise the rod 45 and the nut 43 which will, in turn, raise the left hand end of the lever 38. This will result in lowering the right hand end of the lever 38 and permit the switch button 33 to move outwardly. A decrease in temperature will, of course, cause the lever 38 to push the pin 33 inwardly.

The control point of the thermostat may be adjusted by rotating a dial 47 which is staked to the upper end of the rod 45 to change the distance between the diaphragm 26 and the lower surface of the nut 43. Suitable indicia of temperature are disposed on the dial 47 and an index 48 on the cover 14 indicates the temperature at which the switch will be actuated. The cover 14 is provided with a window through which the indicia may be read. Another opening is provided in the cover for access to a slot in the rod 45 so that it may be adjusted with a screw driver when the cover is in place.

The bottom end of the rod 45 is not attached to the diaphragm 26 but is merely in abutting relation thereto and to cause the rod 45 to follow the diaphragm a spring 52 is provided to bias the nut 43 and rod 45 downwardly. The top end of the spring 52 acts against the sub-frame 20 and the bottom end acts on a collar 54 on the nut 43. The collar 54 is prevented from turning when the rod 45 is turned by a lateral extension 55 which cooperates with a guide 57 carried by the sub-frame 20 as best seen in Figure 4. The collar 54 is slidable on the cylindrical surface of the nut 43 and is biased by the spring 52 into engagement with a conical surface 59 on the nut 43. The angle of the conical surface 59 is such that the force of the spring 52 produces sufficient frictional resistance to rotation to prevent rotation of the nut 43 on rotation of the rod 45. Hence, normal adjustment of the control point by rotation of dial 47 results only in changing the distance between the diaphragm 26 and the lower surface of the nut 43 as briefly described above.

In order to calibrate the device, that is to bring the temperature indicated on the dial 47 into agreement with the actual temperature at which the switch 31 is actuated, the nut 43 may be turned against the frictional force provided by the spring 52. To facilitate turning the nut 43, its upper end is provided with notches 61 which are accessible through openings 62 adjacent the center of the dial 47. By turning the dial 47 so that a pair of these openings are in alignment with the notches 61 it is possible to insert a tool in the nature of a bifurcated screw driver which spans the rod 45 and engages the notches 61. The rod 45 and nut 43 are then turned together until the nut 43 is in its proper angular position in the sub-frame 20. The upper extremity of the guide 57 serves as an index for the indicia on the dial 47 when the cover 14 is removed.

In order to directly immerse the sensing bulb 28 in a liquid whose temperature is to be sensed, it is provided at its upper end with an annular flange 65 which cooperates with an annular internal flange 66 on the lower end of a boiler plug 67, an annular gasket 68 may be interposed between the two flanges to assure a fluid tight seal therebetween but is not necessary if the parts are accurately machined. The flange 65 is forced toward the flange 66 by a pair of identical semi-cylindrical sleeves 70 and 71 which have their edges in abutting relation and together form a complete cylinder which is maintained in place by the cylindrical bore of the boiler plug 67. The upper ends of the sleeves 70 and 71 are provided with lateral extensions 72 and 73 which engage the frame 10 at the periphery of an opening therein. The boiler plug 67 is provided with an annular external flange 75 which serves as an abutment for a yoke 77. A pair of screws 79 and 80 are screw threaded in the yoke 77 and have their heads in engagement with the top surface of the frame 10. When the screws 79 and 80 are tightened, the yoke 77 will be drawn toward the frame 10 which will force the sleeves 70 and 71 into engagement with the flange 65 on the sensing bulb 28 to effect a fluid tight seal between the bulb 28 and the boiler plug 67. The screws 79 and 80 pass through slots 82 in the frame 10 but are held in normal relation thereto by projections 83 formed in the frame 10 at the edge of the slot. When it is desired to remove the device from the liquid container to which it is attached it is merely necessary to loosen the screws 79 and 80, slide the yoke 77 to the left to disengage the flange 75 on the boiler plug 67 and pull the bulb 28 out of the boiler plug 67. On remounting the device on the boiler plug it will be apparent that any angular relation between the instrument proper and the boiler plug may be had since the external flange 75 on the boiler plug is annular and may be engaged by the yoke 77 in any position.

Referring to Figure 5, all the parts shown therein correspond to those described in Figure 1 with the exception of the lever mechanism interconnecting the nut 43 and the switch 31. In this construction the differential of operation, or the difference in temperature between that at which the switch is actuated to one position and the temperature at which it is actuated to its other position may be varied. A main lever 85 is pivoted in the sub-frame 20 on knife edge 86 and its left hand end engages the bottom surface of the nut 43 in the same manner as described above. A secondary lever 88 is pivoted intermediate its length to the main lever 85 and has a right hand end engaging the switch button 33. The left hand end of the secondary lever 88 is movable between a pair of stops 89 and 90 whose position is relatively fixed in the sub-frame 20 but which may be adjusted to select the desired operating differential. A compression spring 91 acts between the main lever 85 and the left hand end of the secondary lever 88 to bias the lever 88 in a counter-clockwise direction with a force such that the force on the switch button 33 is intermediate the forces necessary to actuate the switch to its two operated positions. Hence, if the lever 88 is not in engagement with either the stop 89 or the stop 90 the switch will be maintained in either of its operated positions. If the temperature is increased the main lever 85 will lower the pivot for the secondary lever 88 until its left hand end engages the stop 89 which may then serve as a fulcrum to actuate the lever 88 positively in a clockwise direction to permit outward movement of the switch button 33. Conversely, if the temperature is reduced sufficiently to bring the left hand end of the lever 88 into engagement with the stop 90 the lever 88 will be moved in a counterclockwise direction to positively cause inward movement of the switch button 33. The stop 90 is screw threaded at its upper end and is carried by a nut 93 which is secured to the sub-frame 20. An adjusting handle 94 extends laterally from the upper end of the stop 90 to facilitate its positioning and to indicate its adjusted position.

While the invention has been described in connection with a temperature responsive switch, it will be evident that certain phases of the invention would be equally applicable to control means other than switches. Likewise, condition responsive elements other than the expansible chamber described may be employed. It is to be understood that the scope of the invention is limited only by the appended claims.

I claim as my invention:

1. A condition responsive device comprising, a frame, a rod having a bearing adjacent a first end in said frame, means on the second end of said rod for rotating said rod in said frame, cooperating indicia on the second end of said rod and on said frame exhibiting condition value in accordance with the rotated position of said rod, a nut cooperating with screw threads on said rod, said nut having a cylindrical surface which has a bearing in said frame adjacent the second end of said rod, a collar engaging an enlarged annular surface on said nut, cooperating abutments on said collar and said frame preventing rotation of said collar; a spring biasing said collar toward the enlarged surface of said nut with sufficient force to prevent rotation of said nut on rotation of said rod, means on said nut for rotating said nut with respect to said collar, condition responsive means axially positioning said rod, and control means actuated by said nut on axial movement thereof.

2. A condition responsive device comprising, a frame, a rod having a bearing adjacent a first end in said frame, a dial on the second end of said rod, cooperating indicia on said dial and on said frame exhibiting condition value in accordance with the rotated position of said rod, diaphragm means having a one way conection with the first end of said rod and adapted to axially position said rod in accordance with condition value, a nut cooperating with screw threads on said rod, nut having a cylindrical surface which has a bearing in said frame adjacent the second end of said rod, said nut further having an enlarged annular surface and an abutment surface on the end thereof toward the first end of said rod, a collar having a surface cooperating with the cylindrical surface of said nut and a surface cooperating with the enlarged annular surface of said nut, a spring acting between said frame and said collar biasing said collar into engagement with the enlarged annular surface of said nut and through said nut biasing said rod toward said diaphragm means, cooperating abutments on said collar and on said frame preventing rotation of said collar and through the frictional engagement between said collar and the enlarged annular surface of said nut preventing rotation of said nut on rotation of said rod, said nut being shaped adjacent said dial to receive a tool to effect rotation thereof and said dial being provided with an opening alignable with such shaped portion of said nut to accommodate the tool for rotating said nut, an electric switch carried on said frame, and a lever pivoted in said frame and interconnecting said switch and the abutment surface on said nut, said lever being positioned in accordance with the axial position of said nut.

3. A condition responsive device comprising, a frame, a rod rotatably and axially movable in said frame, a condition responsive element adapted to axially position said rod in said frame, manually positionable means for angularly positioning said rod in said frame, a nut cooperating with threads on said rod, a member carried by said nut, cooperating abutments on said frame and on said member preventing rotation of said member about the axis of said rod, the angular relation of said member and said nut about the axis of said rod being adjustable, and control means actuated by axial movement of said nut.

4. A condition responsive device comprising, a frame, a condition responsive element, a rod axially positionable by said element in accordance with condition value, cooperating indicia on said frame and said rod exhibiting condition value in accordance with the angularly adjusted position of said rod, a nut cooperating with threads on said rod, a collar frictionally engaging said nut and preventing rotation thereof on rotation of said rod, cooperating abutments on said collar and on said frame preventing rotation of said collar about the axis of said rod but premitting axial movement thereof, and a control element actuated by axial movement of said nut.

5. A condition responsive device comprising, a frame, a threaded rod rotatably and axially movable in said frame, a condition responsive element including a diaphragm adapted to axially position said rod in said frame, cooperating indicia on said frame and said rod exhibiting condition value in accordance with the angularly adjusted position of said rod in said frame, a nut on said rod, said nut having a shoulder thereon, a collar having an annular internal surface engaging a cylindrical portion of said nut, a spring acting between said frame and said collar biasing said collar into engagement with the shoulder on said nut and biasing said rod toward said diaphragm, cooperating abutments on said frame and on said collar preventing rotation of said collar about the axis of said rod, and control means actuated by axial movement of said nut.

6. A condition responsive device comprising, a frame, a threaded rod rotatably and axially movable in said frame, a condition responsive element adapted to position said rod axially in said frame, cooperating indicia on said frame and on said rod exhibiting condition value in accordance with the angularly adjusted position of said rod, a nut on said rod, said nut having a cylindrical and a conical external surface, a collar having an internal surface slidable on the cylindrical surface of said nut, a spring biasing said collar axially of said nut into engagement with the conical surface thereon, cooperating abutments on said collar and said frame preventing rotation of said collar about the axis of said rod, and control means actuated by axial movement of said nut.

7. A condition responsive device comprising, a frame, a rod having a bearing in said frame for both rotary and axial movement therein, said rod being threaded in another portion of its length, a nut engaging the threads on said rod and having a cylindrical external surface which has a bearing in said frame, a member carried by said nut and angularly adjustable with respect thereto about the axis of said rod, cooperating abutments on said frame and said member preventing rotation of said member and normally preventing rotation of said nut upon rotation of said rod, a condition responsive element axially positioning said rod, cooperating indicia of condition value on said rod and said frame, and control means actuated by axial movement of said nut.

8. A condition responsive device comprising, a frame, a first member translatable in said frame, a condition responsive element for positioning said first member, an abutment member screw threaded on said first member providing an abutment adjustable on said first member in the direction of translation, an electric snap switch on said frame, said switch having an actuating element biased outwardly and having a force differential between two switch operating positions, a primary lever pivoted at one point on its length in said frame, adapted to engage said abutment member at another point and pivoted at a third point to a secondary lever, said secondary lever having a one way connection with the actuating element of said switch at a point spaced from its pivot in said primary lever, a spring acting on said secondary lever in a direction to bias said secondary lever into engagement with the actuating element of said switch and causing a reaction through said primary lever biasing said primary lever into engagement with said abutment member, said spring exerting a force on said secondary lever producing a force at said switch actuating element intermediate the two switch operating forces for maintaining said switch in either of its operated conditions, spaced stops on said frame adapted to engage opposite sides of a third point on said secondary lever, the distance between said stops being adjustable and the distance therebetween determining the difference in condition value necessary to actuate said switch to its two operative positions.

9. A condition responsive device comprising, a frame, an expansible chamber carried by said frame, control means actuated by said expansible chamber, a temperature sensing bulb, a flexible tube connecting said expansible chamber and said sensing bulb, said bulb having an annular external flange at one end thereof, a body having a cylindrical interior surface and an internal annular flange at one end thereof cooperating with the external flange on said bulb to locate said bulb with the greater part of its length extending out of said body, a pair of semi-cylindrical sleeves within said body having ends abutting the external flange on said bulb, said sleeves having aligned external flanges extending radially beyond the other end of said body, said frame having an opening therein of sufficient size to pass the external flange on said bulb, th eedge of said frame adjacent the opening serving as an abutment for the flanges on said sleeves, a yoke engaging the external flange on said body, and means acting between said frame and said yoke holding said frame in a position in which said sleeves force the flange on said bulb against the internal flange on said body.

10. In a control device, an expansible chamber, control means actuated by said chamber, a temperature sensing bulb, a tube connecting said chamber and said bulb, said bulb having an annular flange at one end thereof, a body having a bore to accommodate the flange on said bulb and having an internal flange at one end, said bulb being disposed with its flange within said body with its flange in engagement with the internal flange of said body and the greater portion of its length extending beyond said body, a sleeve closely fitting within the bore in said body with a first end in engagement with the flange on said bulb and with a second end extending beyond the opposite end of said body, said sleeve comprising two identical semi-cylindrical portions with edges in abutting relation, lateral projections on the second ends of each of said semi-cylindrical portions, and means engaging the lateral projections on said sleeve and said body maintaining said sleeve in a position which maintains the flange on said bulb in engagement with the internal flange on said body.

11. In a control device, an expansible chamber, control means actuated by said chamber, a temperature sensing bulb, a tube connecting said chamber and said bulb, said bulb having an annular flange at one end thereof, a body having a bore to accommodate the flange on said bulb and having an internal flange at one end, said bulb being disposed with its flange within said body with its flange in engagement with the internal flange of said body and the greater portion of its length extending beyond said body, a sleeve closely fitting within the bore in said body with a first end in engagement with the flange on said bulb and with a second end extending beyond the opposite end of said body, said sleeve comprising two identical semi-cylindrical portions with edges in abutting relation, and means engaging the second end of said sleeve and said body maintaining said sleeve in a position which maintains the flange on said bulb in engagement with the internal flange on said body.

References Cited in the file of this patent

UNITED STATES PATENTS

| | | |
|---|---|---|
| 1,035,953 | Dunwody | Aug. 20, 1912 |
| 1,605,057 | Nichols | Nov. 2, 1926 |
| 2,562,385 | Marcellus | July 31, 1951 |
| 2,620,413 | Johnson | Dec. 2, 1952 |